: 2,941,880
: June 21, 1960

2,941,880
METHOD FOR DEFOLIATING WITH A THIOLCARBAMATE

John J. D'Amico, Nitro, W. Va., assignor to Monsanto Chemical Company, St. Louis, Mo., a corporation of Delaware No Drawing. Filed Feb. 28, 1957, Ser. No. 642,925

1 Claim. (Cl. 71—2.7)

This invention relates to methods of destroying, controlling or defoliating vegetation and to compositions useful for such purposes.

General objects of the invention are to provide compositions which are toxic to living plants. A further general object is to provide compositions and methods for the destruction of noxious vegetation. Another object is to provide defoliating compositions. Since the foliage often interferes with the proper functioning of mechanical harvesters, it is important to have efficient defoliating agents available. A further particular object is to provide methods for the destruction or defoliation of plants by applying the toxicant to the foliage or to germinating seeds.

A method of destroying or defoliating vegetation according to this invention comprises applying thereto an effective concentration of a compound conforming to the structure

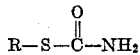

where R is an unsaturated group, preferably a lower alkenyl group. Examples comprise vinyl, allyl, butenyl, cyclohexenyl and propargyl radicals. These are believed to be new compounds.

The alkenyl esters of thiolcarbamic acid comprise compounds having pre-emergence as well as post-emergence utility. Accordingly, by applying the toxicant to the plant is meant any means whereby the toxicant is brought into contact with living plants which latter include germinating seedlings, as for example by application to the ground before the plants emerge as well as direct application to the foliage.

The new toxicants may be applied conveniently in the form of a spray containing the active ingredient in a concentration within the range of 0.1%—10.0% by weight. Thorough coverage of the foliage is effective for defoliation or contact killing. For pre-emergence use amounts within the range of 10–60 pounds per acre generally include the effective range. Examples of grasses which are controlled are foxtail, cheat grass, wild oats, rye grass and crab grass. Weeds from the following plant families are controlled to varying degrees: Leguminaseae, Cucurbitaceae, Embellifereae, Chenopodiaceae, Amarenthaceae, Convolvulaceae and Aizoaceae.

Although most thiolcarbamates are insoluble in water, they are soluble in organic solvents. Most of them are soluble in acetone, chloroform, ethyl alcohol, ethyl acetate, benzene, ether and heptane. The esters may be dispersed directly in water or a solution in an organic solvent emulsified in aqueous medium by the aid of a dispersing agent. As dispersing and wetting agents there may be employed soft or hard sodium or potassium soaps, alkylated aromatic sodium sulfonates such as sodium dodecyl benzene sulfonate, or an amine salt of dodecyl benzene sulfonic acid, alkali metal salts of sulfated fatty alcohols, ethylene oxide condensation products of alkyl phenols or tall oil and other dispersing and wetting agents.

The tables below illustrate characteristic herbicidal activity. The toxicant was emulsified in water and the emulsion applied as a spray. In the foliage tests the spray containing the concentration of the active ingredient shown in the table was applied to the foliage of bean plants. In the pre-emergence tests the spray was applied to the ground of seeded plots before the grass or other plants emerged.

TABLE I
Contact

| Toxicant | Conc., Percent | Effect Observed on Bean Plants |
|---|---|---|
| Allyl thiolcarbamate | 0.5 | 100% defoliation. |
| Do | 0.05 | 90% defoliation. |

The plants employed in the pre-emergence tests are designated by letter in Table II. The plants corresponding to the letters are as follows:

A—Wild oat
B—Brome grass
C—Rye grass (domestic)
D—Buckwheat
E—Mustard (radish)
F—Red clover
G—Sugar beet
H—Cotton
J—Cucumber
K—Corn
L—Foxtail

TABLE II
Pre-emergence

| Toxicant | Rate, Lbs. per Acre | A | B | C | D | E | F | G | H | J | K | L |
|---|---|---|---|---|---|---|---|---|---|---|---|---|
| Allyl thiolcarbamate | 25 | 0 | 2 | 1 | 0 | 0 | 1 | 3 | 1 | 2 | 3 | 1 |

Several methods are available for the preparation of esters of thiolcarbamic acid. The alkenyl halide corresponding to the desired ester is condensed with the alkali metal thiolcarbamate according to one method. In another method an ester of thionocarbamic acid is rearranged to the thiol ester by reaction with an alkenyl halide, the rearrangement being accompanied by trans esterification.

Into a suitable reactor at 15° C. there was mixed 52.6 grams (0.5 mole) of ethyl thionocarbamate and 113 grams (0.675 mole) of 3-iodopropene. The reaction was exothermic, the temperature reaching a maximum of 74° C. in approximately an hour. After standing for 24 hours the product was placed in a 60° C. oven for 12 hours to remove ethyl iodide. Upon cooling to 25° C. a tan solid resulted which was dried on a porous plate at room temperature. The yield was 92.4° of allyl thiolcarbamate melting at 65–70° C. After recrystallization from alcohol it melted at 74–76° C. Analysis gave 11.56% nitrogen as compared to 11.96% calculated for $C_4H_7NOS$.

Formulation of dry defoliating compositions is readily accomplished by mixing a finely divided solid carrier with a minor proportion of the active ingredient. Suitable carriers comprise talc, clay, pyrophyllite, silica and fuller's earth.

It is intended to cover all changes and modifications of the examples of the invention herein chosen for purposes of disclosure which do not constitute departures from the spirit and scope of the invention.

What is claimed is:

The method of defoliating vegetation which comprises applying to foliage an effective concentration of allyl thiolcarbamate.

References Cited in the file of this patent

UNITED STATES PATENTS

| | | |
|---|---|---|
| 2,060,733 | Hunt et al. | Nov. 10, 1936 |
| 2,160,880 | Loane et al. | June 6, 1939 |
| 2,562,011 | Baumgartner | July 24, 1951 |
| 2,608,575 | Mathes | Aug. 26, 1952 |
| 2,631,935 | Baumgartner | Mar. 17, 1953 |
| 2,642,451 | Weijlard et al. | June 16, 1953 |
| 2,650,876 | Stewart | Sept. 1, 1953 |
| 2,687,348 | Kosmin | Aug. 24, 1954 |
| 2,744,898 | Harman | May 8, 1956 |
| 2,786,866 | Hook et al. | Mar. 26, 1957 |

OTHER REFERENCES

Templeman et al.: Nature, vol. 156, 11-24-45, page 630.